UNITED STATES PATENT OFFICE.

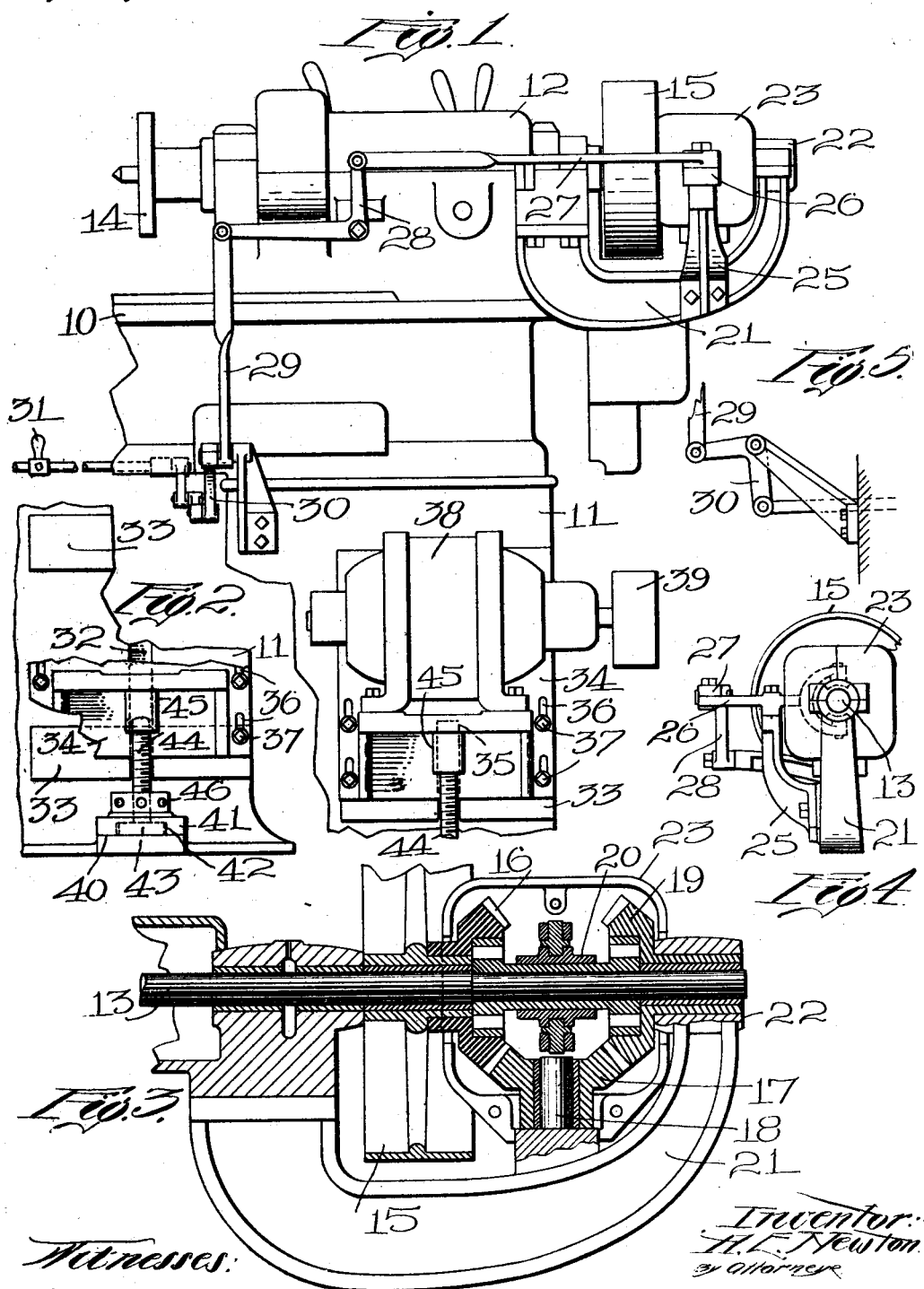

ALBERT E. NEWTON, OF WORCESTER, MASSACHUSETTS, ASSIGNOR TO PRENTICE BROS. COMPANY, A CORPORATION OF MASSACHUSETTS.

LATHE.

1,031,284.  Specification of Letters Patent.  Patented July 2, 1912.

Application filed January 3, 1910. Serial No. 536,107.

*To all whom it may concern:*

Be it known that I, ALBERT E. NEWTON, a citizen of the United States, residing at Worcester, in the county of Worcester and State of Massachusetts, have invented a new and useful Lathe, of which the following is a specification.

This invention relates to lathes, and is particularly adapted to high speed lathes adapted for screw cutting.

The principal objects of the invention are to provide simple, convenient and compact means whereby the head-stock shaft can be driven and reversed from a pulley thereon so that the lathe can be operated without the employment of a counter-shaft and the straight and cross belts ordinarily employed therewith; also to provide improvements in certain details of construction of the head-end of the lathe.

Further objects and advantages of the invention will appear hereinafter.

Reference is to be had to the accompanying drawings, in which—

Figure 1 is a rear elevation of the head end of a high speed screw-cutting lathe constructed in accordance with a preferred embodiment of this invention; Fig. 2 is a rear elevation of the lower portion thereof with the motor removed; Fig. 3 is a vertical central sectional view through the reversing mechanism and connected parts; Fig. 4 is an end view of the same, and Fig. 5 is an end view showing part of the reverse lever mechanism.

The invention is shown as applied to a lathe having a frame 10 provided with a rear leg 11 for supporting it. As usual the head stock 12 is provided with a longitudinal shaft 13 on which the head center 14 is mounted. Instead of having this shaft driven from a counter shaft, it is provided with a pulley 15 mounted to rotate independently of the shaft, and to receive power directly from the main shaft or otherwise as will appear hereinafter. This pulley is not intended to be reversed. To this pulley is fixed a bevel gear 16 with which meshes a bevel gear 17 rotatably mounted on a stud 18, and this in turn meshes with a third bevel gear 19 on the shaft 13. This obviously will drive the shaft 13 in either direction from the pulley 15.

The stud 18 is supported on a bracket 21 which is bolted to the head stock and extends rearwardly and downwardly therefrom. This bracket extends upwardly at the end and is provided with a bearing 22 for the gear 19. The three bevel gears are contained within a casing 23 which is supported by the bracket 21 and is inclosed so as to protect passers by from the gears and to protect the gears from dust. This casing extends over beyond the edge of the pulley 15 where it incloses the hub of the gear 16. The casing is shown as formed in two parts. Mounted on the bracket 21 is an upwardly projecting arm 25 on which is pivoted an operating lever 26 for the clutch. This lever is connected by a link 27, bell-crank 28, link 29, bell-crank 30 and additional connections with an operating handle 31. These connections extend under the bed of the lathe to the front side so that the handle will be within the ready reach of the operator.

It will be seen from the construction so far described that a very simple and compact arrangement is provided whereby the head center can be driven and reversed particularly for screw cutting without the interposition of a counter shaft and double belts. It will also be seen that the parts are so constructed that except when the machine is reversing the reversing gears are not connected up to transmit power and on account of the ordinary conditions under which the machine is used no cutting is done while reversing.

Having provided means directly on the machine itself whereby the rotation transmitted to the driving pulley thereon can be transmitted to the shaft either directly or in a reverse direction without a counter shaft, it will be understood that the driving pulley can be operated by an electric motor. Accordingly this invention contemplates a construction of the frame in such a way that whenever desired a motor can be mounted upon it even after the frame is set up in the shop, without modifying the construction of the frame or machining it. This is accomplished as follows: Preferably on the rear leg 11 is located a guide shown in the drawings as in the form of a vertical groove 32. Near the bottom and top of this groove are two horizontal spots 33 which are planed off vertically to serve as bearing surfaces for the motor frame 34 which can slide up and down on the spots. The motor frame is provided with a vertical projection 35 fitting in the groove 32 and with vertical slots 36. It is designed to be secured to the leg of the lathe by bolts 37 in an obvious manner. On the frame 34 is mounted an electric motor 38 having a pulley 39 in line with the pulley 15 so that the lathe can be driven directly from the motor. The motor is adjusted to tighten the belt between these pulleys in the following way: In the bottom of the leg is a horizontal planing spot 40 on which is screwed a plate 41. This plate has recess 42 in the underside thereof and in this recess is a head 43 of an adjusting screw 44 which projects up through the plate vertically into a fixed nut 45 on the frame of the motor. An operating head 46 is mounted on the screw and provided with holes so that it can be adjusted by inserting a pin or bar and turning the same in a well known way. The projection 35 enters the groove 32 and guides the motor to move vertically when the bolts are loosened and the motor is adjusted as described. It will be seen therefore that the provision of reversing means on the lathe itself so that no counter shaft is necessary is of special importance when it is to be driven by the motor and it will be seen also that with the construction specified a motor of constant or variable speed can be employed as desired, and that the lathe can be sold without the motor and the motor applied whenever desired.

While I have illustrated and described a preferred embodiment of the invention, I am aware that many modifications can be made therein by any person skilled in the art without departing from the scope of the invention as expressed in the claims. Therefore I do not wish to be limited to all the details of construction herein shown and described, but What I do claim is:—

1. In a lathe, the combination with the head stock of a pulley thereon for receiving power, a shaft passing freely through the pulley, a stationary casing mounted adjacent to the pulley and at one side thereof and surrounding the shaft, and reversing mechanism in said casing and connected with the pulley and shaft whereby the direction of rotation of the shaft can be reversed.

2. In a lathe of the character described, the combination with a frame, a head stock therefor, and a head stock shaft mounted in the head stock, of a bracket on the head stock projecting downwardly from the outer end thereof, a pulley on the head stock shaft above said bracket, a casing connected with the outer end of said bracket and located between the same and the pulley, an arm extending upwardly from said bracket on the rear of the head stock, reversing mechanism inside said casing, and means supported by said arm for operating the reversing mechanism.

3. In a lathe of the character described, the combination of a frame, a head stock therefor, a head stock shaft mounted in the head stock, a bracket on the head stock projecting from the outer end thereof, a pulley on the head stock shaft above said bracket, a casing connected with the outer end of said bracket and located between the same and the pulley, an arm extending from said bracket, reversing mechanism inside said casing, means supported by said arm for operating the reversing mechanism, and a driving pulley in alinement with said pulley on the frame.

In testimony whereof I have hereunto set my hand, in the presence of two subscribing witnesses.

ALBERT E. NEWTON.

Witnesses:
 LOUIS W. SOUTHGATE,
 C. FORREST WESSON.